United States Patent [19]
Stauffer

[11] 3,875,401
[45] Apr. 1, 1975

[54] FOCUS DETECTING APPARATUS

[75] Inventor: Norman L. Stauffer, Englewood, Colo.

[73] Assignee: Honeywell Inc., Minneapolis, Minn.

[22] Filed: July 9, 1973

[21] Appl. No.: 377,810

[52] U.S. Cl. .................. 250/201, 250/225, 250/209, 354/195
[51] Int. Cl. ............................................. G07j 1/20
[58] Field of Search ...... 95/44 R, 44 A, 44 B, 44 C; 250/201, 209, 216, 234, 225; 354/195

[56] References Cited
UNITED STATES PATENTS

| | | | |
|---|---|---|---|
| 2,651,771 | 9/1953 | Palmer | 250/225 X |
| 3,516,742 | 6/1970 | Donitz | 95/44 C X |
| 3,532,045 | 10/1970 | Genahr | 354/25 |
| 3,617,761 | 11/1971 | Cooper, Jr. | 250/225 |
| 3,622,797 | 11/1971 | Bragg | 250/234 |
| 3,623,811 | 11/1971 | Lederer et al. | 95/44 C |
| 3,682,071 | 8/1972 | Hosoe | 95/44 C |
| 3,723,003 | 3/1973 | Vockenhuber et al. | 250/201 |

OTHER PUBLICATIONS
Frosch et al.: IBM Technical Disclosure Bulletin; Vol. 15; No. 2; 7/72; pp. 504, 505.
Frosch et al.: IBM Technical Disclosure Bulletin; Vol. 15, No. 2; pp. 504, 505; 7/72.

Primary Examiner—Walter Stolwein
Attorney, Agent, or Firm—Arthur H. Swanson; Lockwood D. Burton; George E. Bodenstein

[57] ABSTRACT

A lens device in an automatic focusing camera is operable to effect a first characterization of the light passing through one half of the lens device, and a second characterization of the light passing through the second half of the lens device. A sensor device includes first and second sensor arrays, each comprising a plurality of discrete light responsive elements. The sensor arrays are so arranged behind the lens device that the first sensor array receives only the light of the first characterization and the second sensor array receives only the light of the second characterization. Each light responsive element of the first sensor array has a corresponding light responsive element in the second sensor array which is vertically displaced therefrom. A signal conditioning circuit, connected to the light responsive elements of the first and second sensor arrays, responds to the differences between the signals generated by corresponding light responsive elements of the first and second sensor arrays to provide an output signal representative of the degree of similarity of the images projected upon the light responsive elements as the lens device is moved with respect to the sensor device. The output signal from the signal conditioning circuit is applied to a detector circuit. The detector circuit is connected to a control circuit which stops the movement of the lens device at the focus position.

15 Claims, 18 Drawing Figures

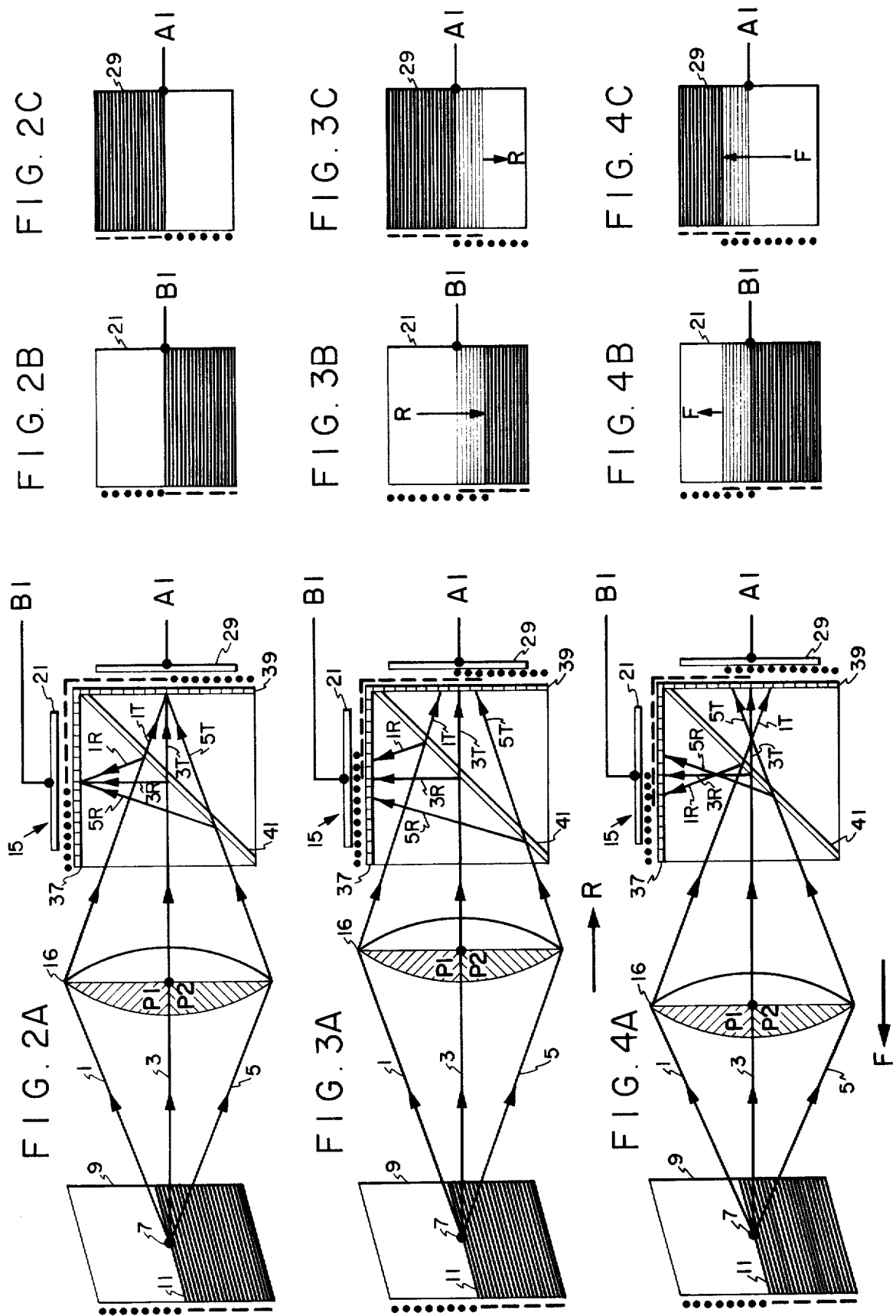

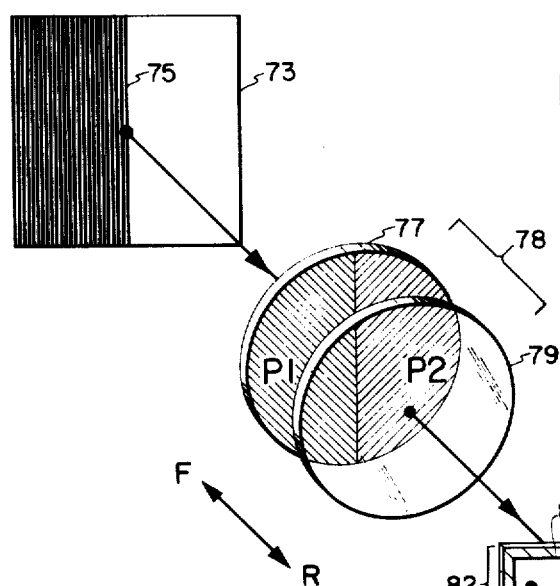
FIG. 5A
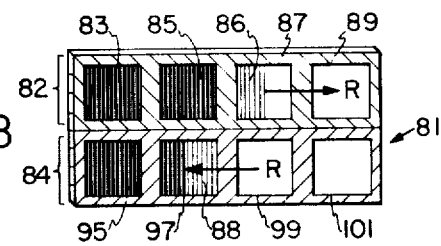
FIG. 5B
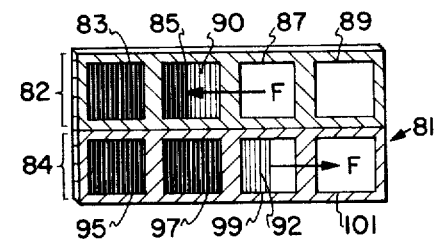
FIG. 5C
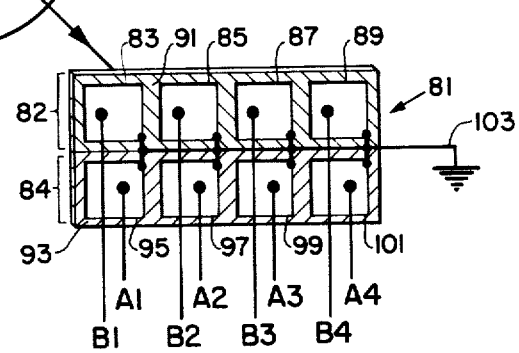
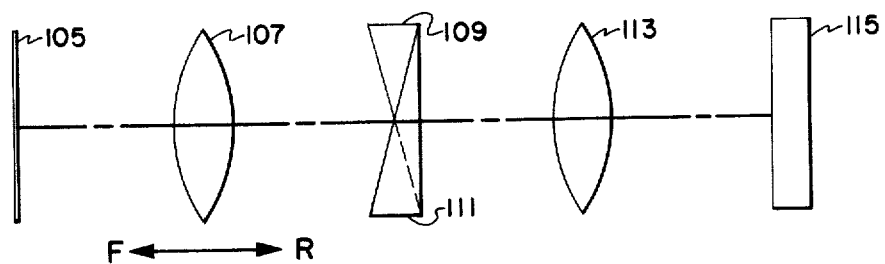
FIG. 6
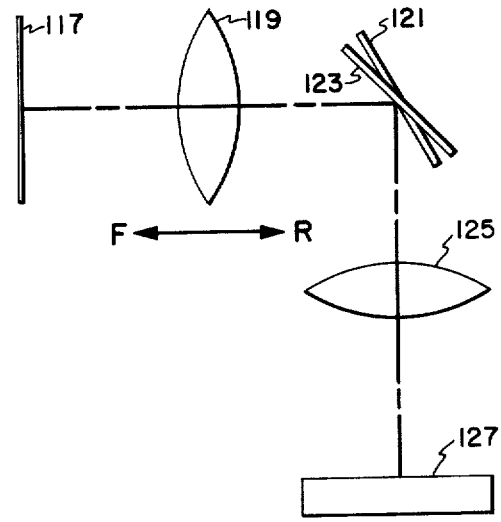
FIG. 7

FOCUS DETECTING APPARATUS

CROSS REFERENCES TO RELATED APPLICATIONS

Subject matter disclosed but not claimed herein is disclosed and claimed in copending application Ser. No. 377,809 filed on even date herewith.

The present invention relates generally to automatic focusing systems, and in particular to a focus position detection apparatus.

In the past, most automatic focusing systems have required two basic motions. One is the motion of a focusing lens with respect to a plane upon which a focused image of a scene is to be formed. The second motion is a scanning motion of a light detector with respect to the image at the image plane. As the lens moves from one extremity to another in a predetermined path of travel, a point will be encountered at which a major portion of a scene being projected upon an image plane will be in focus. The focused portion of the projected image is characterized by abrupt contrast changes of a focused image. If the image is continually scanned during the lens movement, the image contrast changes may be detected. Some focus detecting systems have been developed which obviate the requirement of scanning the image plane in order to determine the best focus position of the objective lens. However, those systems have introduced other disadvantages such as being optically complex, costly, and relatively inaccurate.

SUMMARY OF THE INVENTION

It is, accordingly, an object of the present invention to provide a focus detecting apparatus which obviates the disadvantages of prior art devices.

It is another object of the present invention to provide a focus detecting apparatus which requires no scanning movement.

It is yet another object of the present invention to provide a focus detecting apparatus as set forth, which is relatively simple in design.

It is a further object of the present invention to provide a focus detecting apparatus as set forth, which is more accurate and reliable than prior art devices.

In accomplishing these and other objects, there has been provided, in accordance with the present invention, an improved focus detecting apparatus comprising moveable lens means, characterization means associated with the lens means, a sensor device and a signal conditioning circuit. Light from an object, passing through first and second halves of the lens means is characterized in first and second manners, respectively. The sensor device comprises first and second sensor arrays, each including a plurality of discrete light responsive elements. Each light responsive element in the first sensor array has a corresponding light responsive element in the second sensor array. The first sensor array is arranged to receive only the light characterized in the first manner while the second sensor array is arranged to receive only the light characterized in the second manner. The signal conditioning circuit responds to differences between corresponding light responsive elements of the first and second sensor arrays to provide an output signal representative of the degree of similarity of the images appearing on the first and second sensor arrays as the lens means moves between predetermined limits.

BRIEF DESCRIPTION OF THE DRAWINGS

A better understanding of the present invention may be had from the following detailed description, when read in connection with the accompanying drawings, in which;

FIGS. 2A-2C show a schematic diagram of a side view of the sensor device and light responsive elements in FIG. 1 with the objective lens in the focus position;

FIGS. 3A-3C show a schematic diagram of a side view of the sensor device and light responsive elements of FIG. 1 with the objective lens in a first defocused position;

FIGS. 4A-4C show a schematic diagram of a side view of the sensor device and light responsive elements of FIG. 1 wherein the objective lens is in another defocused position;

FIGS. 5A-5C show a schematic diagram of another embodiment of the present invention and the images appearing on the light responsive elements of the sensor device when the objective lens is in two defocused positions;

FIG. 6 is a schematic diagram of yet another embodiment of the present invention;

FIG. 7 is a schematic diagram of still another embodiment of the present invention;

DESCRIPTION OF THE PREFERRED EMBODIMENTS

Figure 1:
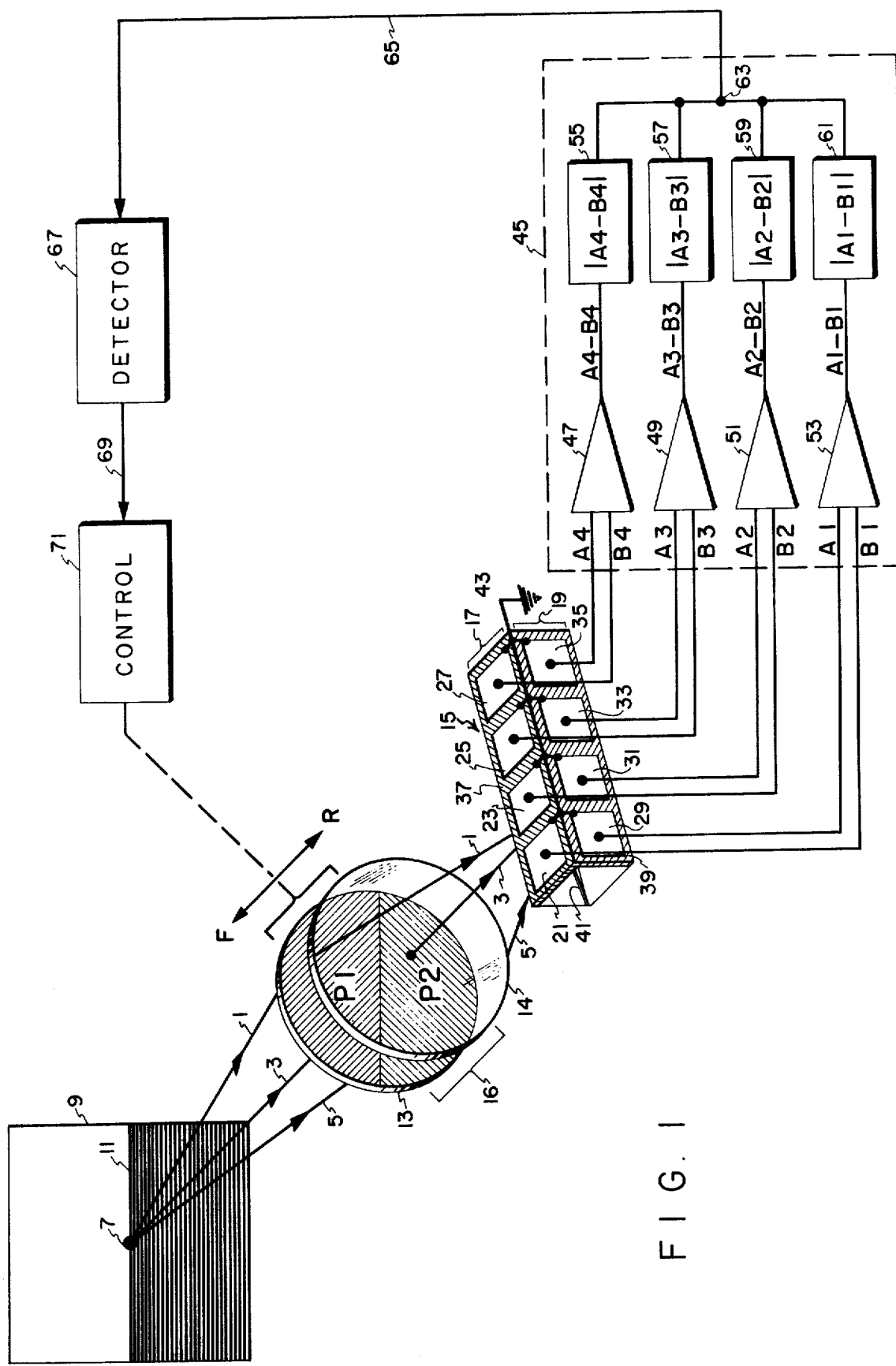
FIG. 1 is a schematic diagram of an automatic focusing system including one embodiment of the present invention.

Referring to FIG. 1 in detail, three rays of light, 1, 3 and 5 are shown eminating from a point 7 on an object 9 to be focused. In the present example, the object 9 to be focused is a square divided horizontally by a line 11, the portion of the square above the line 11 being unshaded and the portion below the line 11 being shaded. The beam of light including the rays 1, 3 and 5 impinges upon a characterization means 13. The characterization means 13 in the present example is a circularly shaped mask of polarized material. The characterization means 13 is horizontally split into two portions, the upper portion being polarized in a direction P1 and the lower portion being polarized in a direction P2. The characterization means 13 is shown in FIG. 1 as being separated from a lens means 14 for the sake of clarity but may be advantageously joined therewith, to form a single moveable member 16. The lens means 14 so converges the light rays 1, 3 and 5 after they have been polarized by the characterization means 13 that when the lens means 14 is in the proper focus position, the light rays 1, 3 and 5 will form a focused image of the point 7 upon at least one predetermined plane as hereinafter explained. The rays 1, 3 and 5 are directed by the lens means 14 toward a sensor device generally indicated at 15. The sensor device 15 includes a first light sensor array or sensing means 17 and a second light sensor array or sensing means 19. The first sensor array 17, in the exemplarly embodiment, comprises four light responsive elements 21, 23, 25 and 27 arranged horizontally in a plane perpendicular to the plane of the lens means 14. The second light sensor array 19 similarly includes four light responsive elements 29, 31, 33 and 35 arranged in a plane parallel to the plane containing the lens means 14. A polarizing material or mask 37, which is polarized in a first direction P1, is arranged to allow only the light polarized in the first direction P1, to fall on the light responsive elements 21, 23, 25 and 27 of the first sensor array 17. The light responsive elements 29, 31, 33 and 35 of the second light sensor array 19 also have a polarizing material or mask 39, associated therewith, but which is polarized in a second direction P2, and allows only light polarized in the second direction P2 to fall on the light responsive elements 29, 31, 33, 35 of the second sensor array 19. The sensor device 15 further includes a semi-reflective, semi-transmissive mirror means 41 placed diagonally across the entire length of the rectangular form defined by the first and second sensor arrays 17 and 19. The mirror 41 has one edge thereof placed on the common line between the first and second arrays 17 and 19. Each light responsive element is connected by a common lead 43 to ground. In addition, each light responsive element 21, 23, 25 and 27 of the first sensor array 17 generates an output signal B1 to B4, respectively, which is applied to a signal conditioning circuit 45. The light responsive elements 29, 31, 33 and 35 of the second sensor array 19 similarly generate output signals A1, A2, A3 and A4, respectively, which are also applied to the signal conditioning circuit 45. Each light responsive element 21, 23, 25 and 27 of the first light sensor array 17 has a corresponding light responsive element 29, 31, 33, and 35, respectively, in the second sensor array 19 vertically displaced therefrom. The signal conditioning circuit 45 includes four differential amplifiers 47, 49, 51 and 53. Each of the four differential amplifiers 47, 49, 51 and 53 is responsive to signals from a pair of corresponding light responsive elements in the first and second sensor arrays 17 and 19 for providing a signal representative of the difference therebetween. Each of the differential amplifiers 47, 49, 51 and 53 has its output connected to the input of an absolute value determining circuit 55, 57, 59, and 61, respectively. The outputs from the absolute value determining circuits are in turn connected to a summing junction 63 at which appears an output signal of the signal conditioning circuit 45 representative of the degree of similarity of the images projected on the first and second sensor arrays 17 and 19. The summing junction 63 is connected by a lead 65 to a detector circuit 67. The detector circuit 67 detects when the lens means 14 is in the focus position and provides an output signal representative thereof. That output signal is supplied to a control circuit 71 by a lead 69. The control circuit 71 is operable to move the moveable member 16 including the lens means 14 and the polarizing mask 13, in a forward direction toward the object 9 to be focused and also in a reverse direction toward the sensor device 15. The control circuit 71 is further operative to terminate the movement of the moveable member 16 when the moveable member 16 is in the proper focus position as determined by the sensor device 15 in cooperation with the signal conditioning circuit 45 and the detector circuit 67.

FIGS. 2A, 3A and 4A show a side view of the sensor device 15 and the moveable member 16 with the moveable member 16 appearing in different relative positions with respect to the sensor device 15. FIGS. 2B, 3B and 4B show the images appearing on the light responsive element 21 for the three different positions, and FIGS. 2C, 3C and 4C show the images appearing on the light responsive element 29 for the three positions of the moveable member 16. In FIGS. 2A, 3A and 4A, light coming from the shaded portion of the object 9 to be focused is indicated by dashes appearing to the left of the object 9 while light coming from the unshaded portion of the object 9 is identified by dots shown to the left of the object 9. Those designations will aid in tracing of the light from the object 9 through the moveable member 16, and onto the first and second sensor arrays of the sensor device 15. In FIG. 2A, the moveable member 16 is in the focus position. The rays 1, 3 and 5 coming from the point 7 on the object 9, are characterized or polarized in first and second directions P1 and P2 as they pass through the moveable member 16. After passing through the moveable member 16, the rays 1, 3 and 5 converge toward the semi-transmissive, semi-reflective mirror 41. The mirror 41 reflects rays 1R, 3R and 5R toward the mask 37 which is polarized in the first direction P1, and also transmits rays 1T, 3T and 5T toward the mask 39 which is polarized in the second direction P2. In FIGS. 2A, 3A and 4A the light responsive elements 21 and 29 are shown displaced from their corresponding polarized masks 37 and 39, respectively, for purposes of illustration. In actual construction, however, the polarized masks 37 and 39 are so thin that the light responsive elements, which are immediately adjacent to the masks, lie in substantially the same plane as the corresponding polarized masks 37 and 39, respectively. The reflected rays 1R, 3R and 5R converge to form a focused image of the point 7 on the mask 37. The transmitted rays 1T, 3T and 5T converge and form a focused image of the point 7 on the mask 39. Since the mask 37 is polarized in the first direction, it will allow only that light which is also polarized in the first direction to pass therethrough and be sensed by the light responsive element 21. Since only that light between the rays 1R and 3R is polarized in the first direction, only that light between the rays 1R and 3R will be allowed to fall on a light responsive element 21. The light between the rays 3R and 5R, since it is polarized in the second direction P2, will be blocked by the mask 37. Since the path of a ray of light passing through the center of the lens is unaltered by the lens, it can be seen that the light coming from the shaded lower portion of the object 9 will fall on the right side of the light responsive element 21 as shown in FIG. 2A by the dashed lines between the mask 37 and the light responsive element 21. Similarly, the light coming from the unshaded portion of the object 9 will fall on the left half of the light responsive element 21 as shown by the dots between the light responsive element 21 and mask 37. Therefore, the image appearing on the light responsive element 21, as seen from the mirror 41, appears as shown in FIG. 2B with the lower portion being shaded and the upper portion being unshaded.

Since the mask 39 is polarized in the second direction, it will allow only light polarized in the second direction, i.e. the light between rays 3T and 5T, to pass through the mask 39 and fall on the light responsive elements 29. The light between the rays 1T and 3T, since it is polarized in the first direction P1, will be blocked by the mask 39. The rays 3T and 5T converge at the mask 39 to form a focused image of the point 7. Light coming from the unshaded portion of the object 9 will be focused on the lower half of the light responsive element 29 while light coming from the shaded half of the object 9 will be focused on the upper portion of the light responsive element 29. That light distribution on the light responsive element 29 is illustrated by the dots and dashes between the light responsive element 29 and the mask 39. The image formed on the light responsive element 29 as seen from the mirror 41 is shown in FIG. 2C, the top half being shaded and the lower half being unshaded. It should be noted in connection with FIG. 2A that when the moveable member 16 is in the proper focus position, equal amounts of total light will fall on both light responsive elements 21 and 29. Therefore, if each light responsive element 21 and 29 generates a signal which represents the amount of light falling thereon, both signals are substantially equal and a signal representative of the difference between the magnitudes of the generated signals is substantially zero.

In FIG. 3A the moveable member 16 is shown displaced toward the sensor device 15 from the focus position shown in FIG. 2A. The mask 37, being polarized in the first direction P1, allows only light which is characterized or polarized in the first direction i.e. the light between rays 1R and 3R, to pass therethrough and fall on the light responsive element 21. Therefore, the light coming from the shaded portion of the object 9 will appear on the light responsive member 21 to the right of the ray 3R while light from the unshaded portion of the object 9 will appear on the light responsive element 21 to the left of the ray 1R. Because the moveable member 16 is not in the focus position, the rays 1R and 3R do not meet at the light responsive element 21 and there is a gray area, or an overlapping of the light and dark areas. The light, dark and gray areas are indicated by the dots, dashes, and overlapping dots and dashes, respectively, between the light responsive element 21 and the mask 37. The image appearing on the light responsive element 21, as viewed from the mirror, 41 is shown in FIG. 3B. As the moveable member 16 is moved toward the sensor device 15, i.e. in the reverse direction R, the area of gray representing the overlapping of the light and dark areas on the light element 21 will increase as indicated in FIG. 3B. Similarly, the mask 39 allows only light polarized in the second direction P2 to pass therethrough and fall on the light responsive element 29. Therefore only the light between the rays 3T and 5T will fall on the light responsive element 29. Light from the shaded area of the object 9 will impinge upon the mask 39 on that portion of the mask 39 above the ray 5T in FIG. 3A. Rays of light from the unshaded portion of the object 9 will appear on the portion of the mask 39 below the ray 3T. The light intensity distribution appearing on the light responsive element 29 is shown by the dashes and dots between the mask 39 and the light responsive element 29. As was the case with the reflected light, the transmitted light rays also effect the appearance of a gray area between the rays 3T and 5T as shown in FIG. 3C. As the moveable member 16 is moved closer to the sensor device 15, that gray area will cover more and more of the unshaded portion of the image on the light responsive element 29. Therefore, as the moveable member 16 is moved in the reverse direction R, the image appearing on the light responsive element 21 will become relatively lighter and the image appearing on the light responsive element 29 will become relatively darker. The difference between the signals generated by the light responsive elements 21 and 29 will therefore become greater as the moveable member 16 including the lens means 14 is moved away from the focused position in the reverse direction.

In FIG. 4A, only the light between the rays 1R and 3R will pass through the mask 37 and fall on the light responsive element 21. The light from the shaded portion of the object 9 will appear on the light responsive element 21 to the right of the ray 1R while the light from the unshaded portion of the object 9 will appear on the light responsive element 21 to the left of the ray 3R. Similarly, light from the shaded portion of the object 9 will appear on the mask 39 above the ray 3T while the light from the unshaded portion of the object 9 will appear on the mask 39 below the ray 5T. Again, as was the case in FIG. 3A, there is a gray area where there is an overlapping of the light and dark areas appearing on the light responsive elements 21 and 29. That overlapping or gray area will increase in the directions noted in FIGS. 4B and 4C as the moveable member 16 is moved away from the focused position in the forward direction. The total light appearing on the light responsive element 21 will decrease and the total light appearing on the light responsive element 29 will increase as the moveable member 16 is moved in the forward direction F away from the focused position. Therefore, the difference between the signals B1 and A1 generated by the light responsive elements 21 and 29 respectively, will increase as the lens is moved away from the focused position in a forward direction F toward the object to be focused.

Therefore, it is apparent that the difference between the corresponding light responsive elements of the first and second sensor arrays will be minimal when the moveable member 16, including the lens means 14 and the characterization means 13, is at the proper focus position. Referring again to FIG. 1, the absolute values of the respective difference signals between corresponding light responsive elements are summed at the junction 63 and detected by the valley detector 67. When the valley detector 67 senses a minimal or valley signal, a control signal is applied to the control circuit 71 through the lead 69 to effect the termination of movement of the moveable member 16 at the proper focus position.

In FIG. 5A an object to be focused 73 includes an unshaded and a shaded area separated by a vertical line 75. Light from the object 73 passes through the characterization means 77 and the lens means 79, which together comprise a moveable member 78, and falls on a sensor device 81. The sensor device 81 shown in FIG. 5A is of a simpler construction than that shown in FIGS. 1 through 4 and may be used in situations where little or no vertical light differences in the object to be focused are expected. The characterization means 77 is split vertically with one half polarized in the first direction P1 and the other half being polarized in a second direction P2. The sensor device 81 is split horizontally the upper portion of which is covered with a polarization material or mask 91 polarized in the first direction P1 while the lower half is covered by a material or mask 93 polarized in the second direction P2. The upper portion of the sensor device 81 comprises a first sensor array or sensing means 82 including light responsive elements 83, 85, 87 and 89, with the polarized mask 91 arranged between the light responsive elements and the moveable member 78. Similarly, the second sensor array or sensing means 84 includes four light responsive elements 95, 97, 99 and 101 vertically displaced from corresponding light responsive elements of the first sensor array 82. A polarized material or mask 93 is placed between the light responsive elements of the second sensor array 84 and the moveable member 78. All of the light responsive elements are commonly connected to ground by a lead 103 and each provides an individual output signal representative of the light falling thereon. Those output signals may be connected to the signal conditioning circuit 45 of the system shown in FIG. 1.

When the moveable member 78 is displaced in the reverse direction R away from the focus position, the image of the vertical line 75 on the object 73 will appear to be discontinuous on the sensor device 81 as shown in FIG. 5B. As the moveable member 78 moves in the reverse direction R, the semi-shaded or gray area 86 on the first sensor array 82 will cover more and more of the formerly unshaded area of the first sensor array 82 while the semi-shaded or gray area 88 of the second sensor array 84 will expand into the formerly shaded area of the second sensor array 84, as indicated by the arrows in FIG. 5B. Conversely, when the moveable member 78 moves in the forward direction F toward the object to be focused from the focus position, the gray area 90 (FIG. 5C) will expand into the formerly shaded area of the first sensor array 82 while the gray area 92 will cover more of the formerly unshaded area of the second sensor array 84. When the moveable member 78 is in the focus position, the vertical line 75 of the object 73 will appear continuous on the sensor device 81 and there will be no differences in the light received by corresponding light responsive elements (83 & 95, 85 & 97, 87 & 99, and 89 & 101) of the first and second sensor arrays. However, when the moveable member 78 is displaced in either the forward F or reverse R directions from the focus position, there will be a difference between the total light received by at least one set of corresponding light responsive elements as shown in FIGS. 5B and 5C. That is, there will be a corresponding change in the distribution of the light intensity with respect to the sensor arrays. Therefore, if the object to be focused has little or no vertical light differences, the difference signals between corresponding light responsive elements of the first and second sensor arrays will be minimal when the moveable member 78 is at the focus position.

FIG. 6 shows another characterization means of the focus detecting system of the present invention. Light from an object 105 to be focused passes through a lens 107 toward two prisms 109 and 111. Each of the prisms 109 and 111 covers one half of a cross section of the light from the lens 107. The prisms 109 and 111 refract the light passing therethrough toward another lens 113. A sensor device 115 is arranged to receive the light from the lens 113. The sensor device 115 may take the form of the sensor device 81 of FIG. 5, depending upon the nature of the object to be focused as hereinbefore explained. The operation of the system of FIG. 6 is substantially the same as the operation of the systems shown in FIGS. 1 and 5 insofar as each sensor array "sees" only that light coming through one half of the objective lens (107 in FIG. 6).

In FIG. 7, light from an object to be focused 117 passes through an objective lens 119 toward two non-parallel mirrors 121 and 123. The mirrors 121 and 123 reflect one half of a cross section of the light comming through the lens 119, in different directions, respectively, toward another lens 125. A sensor device 127 is arranged to receive the light from the lens 125. The sensor device 127 may take the form of the sensor device 15 of FIG. 1 or the sensor device 81 of FIG. 5. As was the case with the system shown in FIG. 6, each sensor array of the sensor device 127 "sees" only light from the object to be focused through one half of the objective lens 119.

Figure 8:
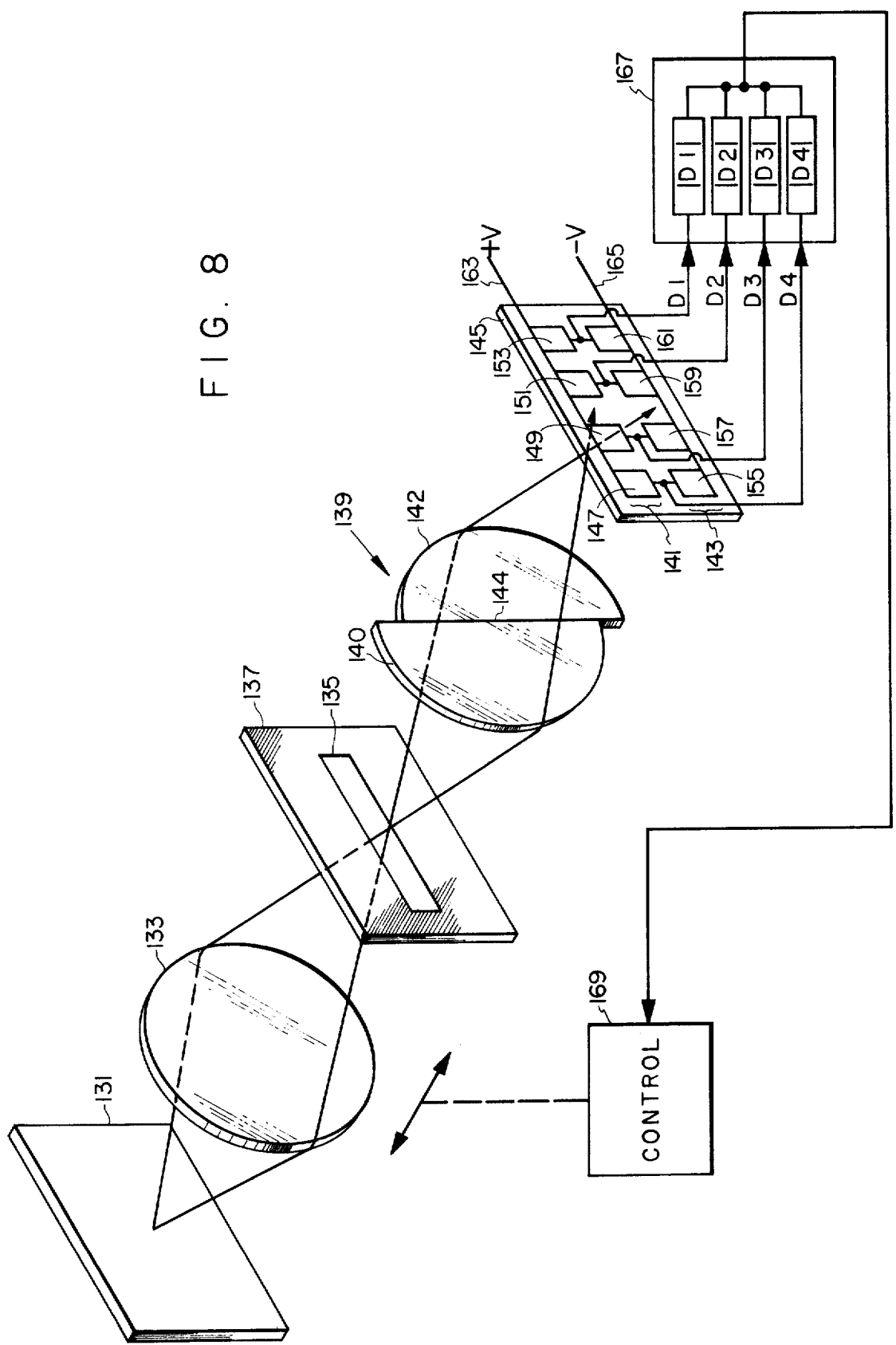
FIG. 8 is a schematic diagram of a further embodiment of the present invention.

In FIG. 8, radiation from an object 131 passes through a moveable lens 133 to converge on an opaque member 137 which includes a slit 135. Thus, when the moveable lens 133 is in the proper focus position, an image of the object 131 will be formed on the opaque member 137 and a portion of the radiation forming that image will pass through the slit 135 to be refocused by a lens structure 139 to form first and second vertically displaced images of the image appearing at the slit 135 on first and second light sensing means 141 and 143, respectively, of a light sensing device 145. The arrangement of the first and second light sensing means 141 and 143 in FIG. 8 is similar to that shown in the previous embodiments except that the individual radiation responsive elements in the first and second light sensing means 141 and 143 are photo resistive in FIG. 8 whereas the corresponding radiation responsive elements in the previous embodiments were photo voltaic. Either type photo-responsive element may be used with the present invention. The circuitry of the signal processor will change accordingly, depending, inter alia, upon which type element is used. In the present example the first light sensing means 141 includes four photo resistive elements 147, 149, 151 and 153. The second light sensing means 143 includes corresponding photo resistive elements 155, 157, 159 and 161, respectively. A bus 163 having a common connection to a first terminal of each of the photo resistive elements in the first light sensing means 141 is connected to a positive reference potential +V and a bus 165 having a common connection to a first terminal of each of the photo resistive elements in the second light sensing means 143 is connected to a second reference potential −V which is equal in magnitude but opposite in polarity from the first reference potential +V. The corresponding photo resistive elements of the first light sensing means 141 and the second light sensing means 143 have their second terminals connected together.

Figure 9:
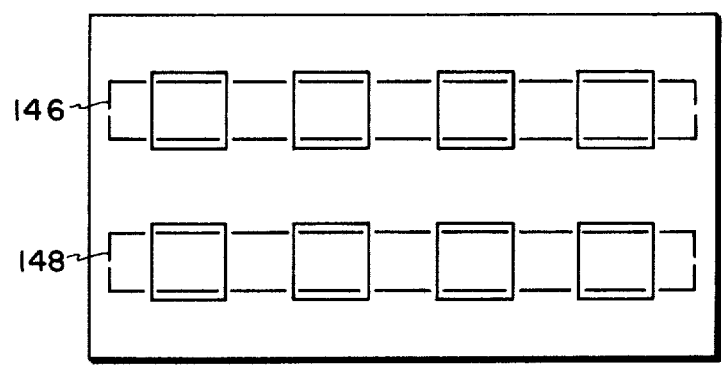
FIG. 9 is an illustration showing a portion of the embodiment shown in FIG. 8.

The lens structure 139 includes first and second lens sections 140 and 142, respectively, which, in the present example, are shown as half lenses. The first and second lens sections 140 and 142 are so displaced along a common interface 144 that one image 146 of the image appearing at the slit 135 will be projected upon the first light sensing means 141 through the first lens section 140, while a second image 148 of the image appearing at the slit 135 will be projected upon the second light sensing means 143 through the second lens section 142 as shown in FIG. 9. A signal processor 167 receives as inputs thereto the difference signals D1, D2, D3 and D4, generated at the junctions between corresponding photo resistive elements of the first and second light sensing means 141 and 143. The signal processor, in turn, provides a focus signal which is applied to a control circuit 169. The control circuit 169 operates to control the movement of the moveable lens 133.

When the moveable lens 133 is in the proper focus position the images 146 and 148 projected upon the first and second light sensing means 141 and 143, respectively, have substantially the same intensity distribution and the voltage appearing at the junction between the corresponding photo resistive elements of the first and second light sensing means 141 and 143 will be substantially zero. The signal processor 167 includes, for example, an absolute value circuit for each input thereto, and the outputs of the absolute value circuits are connected at a common junction to provide an output signal from the signal processor 167. When the difference signals D1 to D4 are substantially zero, the output signal from the signal processor 167 will be at a minimal value. The control circuit 169 includes well known circuitry to sense that minimal value and, in turn, terminate the movement of the moveable lens 133 at the focus position.

Figure 10:
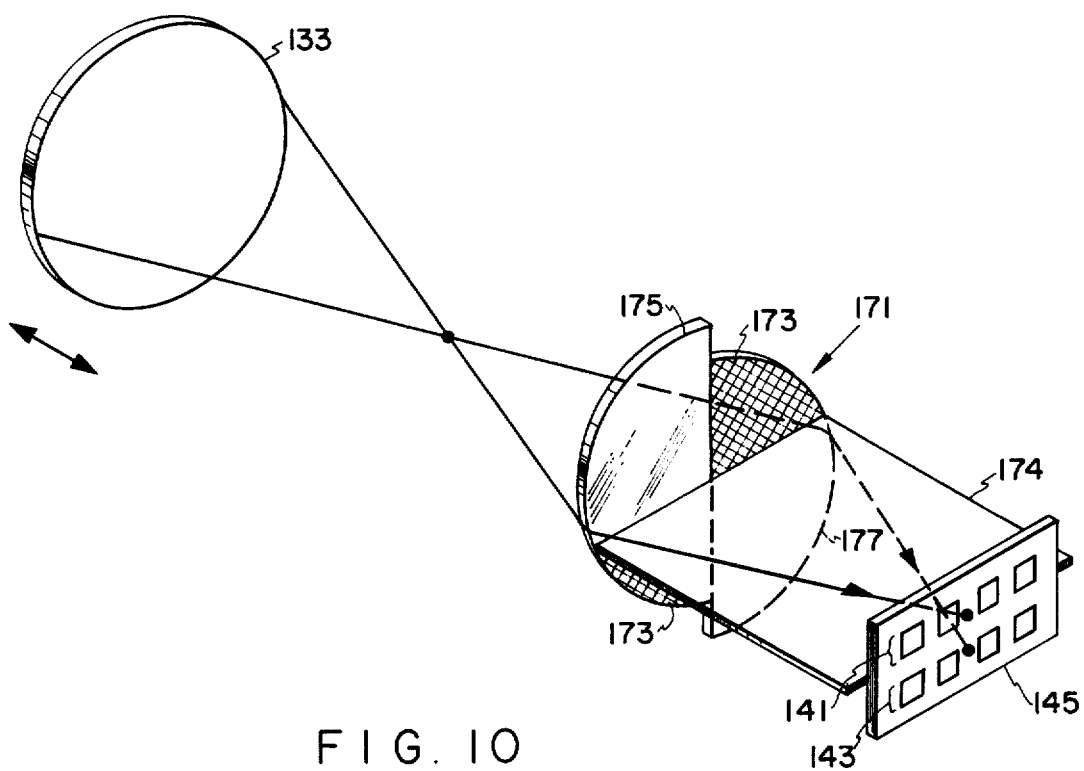
FIG. 10 is a schematic diagram showing an alternative arrangement of a portion of the embodiment shown in FIG. 8.

FIG. 10 shows a lens structure 171 in combination with an opaque member 174 which combination may be substituted for the lens structure 139 of FIG. 8. With the combination shown in FIG. 10, the opaque member 137 including the slit 135 is not an essential component, and therefore, all of the radiation passing through the moveable lens 133 will be presented to the lens structure 171 rather than only that radiation passing through the slit 135 of FIG. 8. The lens structure 171 again includes two half lens vertically displaced along a common interface. However, the bottom portion of one of the half lenses and the top portion of the other half lens are covered, for example, by an opaque material 173 to render them unable to transmit radiation therethrough. Therefore, the operable lens sections comprising the lens structure 171 are the uncovered portions 175 and 177 of the vertically displaced half lenses. The opaque member 174 is disposed between the lens structure 171 and the light sensing device 145 on a plane to physically prevent radiation coming through the first lens portion 175 from falling on the second light sensing means 143, and radiation passing through the second lens portion 177 from falling on the first light sensing means 141. The operation of the embodiment shown in FIG. 10 is similar to that shown in FIG. 8 in that when the moveable lens 133 is in the proper focus position, the output difference signal from each pair of corresponding light sensing elements of the light sensing device 145 will be substantially zero volts thereby ultimately effecting the termination of the movement of the moveable lens 133. With the opaque member 174 disposed as shown in FIG. 10, the opaque member 137 including the slit 135 is unnecessary to restrict the dimensions of the images appearing on the light sensing device 145 so there will be no overlapping of the first image on the second light sensing means or the second image on the first light sensing means since that function is now performed by the opaque member 174.

In a practical application of the focus detecting system of the present invention the viewing angle of the focus detecting system is significantly smaller than the viewing angle as seen from a light sensitive film in a camera, for example, in order to distinguish the particular area to be focused upon from the remainder of the general scene. The focus detecting viewing angle may be indicated through the view finder of the camera and may be, for example, of the order of 1° to 10°. The moving lens in the focus detecting system will of course be so operatively coupled to the main objective lens of the camera that the state of focus of the image on the light sensing device will, at all times, be substantially the same as the state of focus of the image at the film plane.

The present invention obviates the need for a scanning motion between the image formed and the detecting device. The utilization of a plurality of individual light responsive elements in each detector array greatly enhances the accuracy and reliability of the focus detecting apparatus of the present invention. The utilization of a beam splitter ahead of the light responsive elements provides for a focus detecting apparatus which is substantially immune from inaccuracies introduced in prior art devices as a result of focusing scenes having non-uniform light distribution patterns.

Thus, there has been provided, in accordance with the present invention, an improved focus detecting apparatus which requires no moving parts other than an objective lens, and which provides for a more accurate and reliable detection of the focused position of the objective lens, regardless of the light distribution of a scene to be focused, while being relatively simple in design and construction.

The embodiments of the present invention in which an exclusive property or privilege is claimed, are defined as follows:

1. A focus detecting apparatus for use in focussing an image of an object, the focus detecting apparatus comprising:
   a single radiation gathering and receiving means arranged to receive radiation over a single path from the object for forming from said radiation two distinctly characterized and discretely identifiable portions of radiation and for forming first and second images from said portions;
   adjusting means for varying the intensity distributions of said first and second images;
   first and second sensing means, each consisting of a plurality of sensing elements arranged to sense the intensity distributions of said first and second images, respectively, and to provide difference signals representative of the differences between intensity distributions of said first and second images, which intensity distributions vary as a function of the condition of focus of said images; and
   means connected to said first and second sensing means for providing an output signal indicative of the condition of focus of the images formed by said discretely identifiable portions.

2. The focus detecting apparatus as set forth in claim 1 wherein said receiving means includes means for spatially separating said portions.

3. The focus detecting apparatus as set forth in claim 1 wherein said receiving means includes polarization means for distinctly characterizing each of said portions.

4. The focus detecting apparatus as set forth in claim 1 wherein each of said first and second sensing means includes a plurality of radiation responsive elements.

5. The focus detecting apparatus as set forth in claim 1 wherein said receiving means comprises first and second lens portions, said first lens portion being arranged to define a first discretely identifiable portion and to form said first image therefrom, said second lens portion being arranged to define a second discretely identifiable portion and to form said second image therefrom.

6. The focus detecting apparatus as set forth in claim 5 wherein said first and second lens portions have a common interface, said first and second lens portions being equally displaced along said common interface in opposite directions, said first and second sensing means being arranged to receive radiation passing through said first and second lens portions, respectively.

7. The focus detecting apparatus as set forth in claim 5 wherein said receiving means further includes an opaque masking means arranged between said lens portions and said sensing means, further masking means being arranged to block the passage of radiation through the part of said first lens portion lying on one side of said first mentioned opaque masking means and to block the passage of radiation through the part of said second lens portion lying on the opposite side of said first mentioned opaque masking means, said masking means cooperating to substantially preclude radiation from said first lens portion from impinging upon said second sensing means and radiation from said second lens portion from impinging upon said first sensing means.

8. A focus detecting apparatus comprising:
moveable lens means for focusing a beam of light from a distant object to form an image on at least one image plane;
characterization means associated with said lens means for effecting a first characterization of the light passing through one portion of said lens means, and a second characterization of the light passing through the remaining portion of said lens means;
first and second sensor arrays arranged to receive said characterized light from said characterization means, each of said sensor arrays comprising a like plurality of discrete coplanar light responsive elements, said first sensor array being arranged to have only light of said first characterization falling thereon, and said second sensor array being arranged to have only light of said second characterization falling thereon, said light responsive elements of said first sensor array being linearly displaced along a first line, said light responsive elements of said second sensor array being linearly displaced along a second line, said first and second lines being symmetrical with respect to a third line midway between said first and second sensor arrays, each of said light responsive elements in said first sensor array having a corresponding light responsive element in said second sensor array displaced therefrom in a direction perpendicular to said third line, each of said light responsive elements being operable for providing an electrical signal in accordance with the amount of light falling thereon; and
signal conditioning means connected to said light responsive elements of said first and second sensor arrays, said signal conditioning means being responsive to said electrical signals for providing an output signal representative of the degree of similarity of images formed on said first and second sensor arrays as said lens means is moved with respect to said first and second sensor arrays.

9. The focus detecting apparatus as set forth in claim 8 wherein said first and second sensor arrays are coplanar and parallel to each other.

10. The focus detecting apparatus as set forth in claim 8 and further including a beam splitter means arranged to receive said characterized light from said lens means, said beam splitter means being operative to pass a portion of said characterized light therethrough to fall on said first sensor array, and reflect a portion of said characterized light to fall on said second sensor array, said second sensor array being arranged in a plane perpendicular to a plane containing said first sensor array.

11. The focus detecting apparatus as set forth in claim 8 wherein said signal conditioning means includes differential amplifier means responsive to said electrical signals from corresponding light responsive elements of said first and second sensor arrays for providing, for each pair of corresponding electrical signals, a differential signal representative of the difference therebetween, operating means connected to said differential amplifier means for providing, for each differential signal, a signal representative of the absolute value thereof, and summation means connected to said operating means for summing said absolute value signals and providing said output signal representative of the sum of said absolute value signals.

12. The focus detecting apparatus as set forth in claim 8 wherein said characterization means comprises first and second polarizing masks polarized in first and second directions, respectively, for providing said first and second characterizations, respectively, said first and second sensor arrays including third and fourth polarizing masks, repectively, interposed between said first and second sensor arrays, repectively, and said characterization means, said third polarizing mask being polarized in said first direction and said fourth polarizing mask being polarized in said second direction.

13. The focus detecting apparatus as set forth in claim 8 wherein said characterization means includes diverting means arranged for receiving said beam of light after passing through said lens means, said diverting means being operative to divert a portion of said light beam from said lens means along a first path toward only said first detector array, said diverting means being further operative to divert the remaining portion of said light beam from said lens means along a second path, toward only said second detector array.

14. The focus detecting apparatus as set forth in claim 13 wherein said diverting means includes first and second refracting means.

15. The focus detecting apparatus as set forth in claim 13 wherein said diverting means includes first and second reflecting means.

* * * * *